Sept. 27, 1955     R. E. ALLISON     2,719,276

INDUCTANCE DEVICE

Filed Feb. 28, 1952

INVENTOR.
RALPH E. ALLISON,

BY Hazard & Miller

ATTORNEYS

United States Patent Office 2,719,276
Patented Sept. 27, 1955

2,719,276

INDUCTANCE DEVICE

Ralph E. Allison, Whittier, Calif., assignor to Patent Management, Incorporated, Minneapolis, Minn., a corporation of Minnesota Application February 28, 1952, Serial No. 273,909

11 Claims. (Cl. 336—110)

This invention relates to improvements in inductance devices wherein one or more coils are adapted to be energized by an alternating current.

A primary object of the invention is to provide an inductance device which is so constructed that the inductance will remain constant or substantially so, throughout a relatively wide range of applied coil voltages. There are a large number of situations in various electric circuits wherein it is highly desirable that an inductance coil included in the circuit shall have its inductance remain constant or substantially so through a relatively wide range of applied coil voltages, and the present invention concerns an inductance device possessing such characteristics. If a coil that is adapted to be energized with an alternating current voltage has a single closed core extending therethrough, it will be found that the inductance of the unit increases rather rapidly with an increase of the applied voltage. This rate of increase is not extremely rapid where the applied voltages are quite low, but where the applied voltages are relatively high a small increase in the applied voltage results in a very rapid increase in the inductance of the unit. If a magnet or magnetic flux generator is applied to this single closed core so as to develop or impart thereto magnetic flux, it will be found that the characteristics of the unit are very much the same. That is, if the applied voltage to the coil is relatively high, a small increase in voltage will result in a rapid or great increase in inductance.

In accordance with the present invention the inductance unit may consist of one or more coils in which there are two spaced cores so arranged that at a given instant of time the alternating current voltage supplied to the coil or coils causes magnetic flux to be developed or generated in both cores in one direction and in the other half of the cycle in the other direction. A magnet is associated with the cores which may be either permanent or an electromagnet and this also generates or develops within the cores a magnetic flux. The flux generated by the magnet and developed in the cores at a given instant of time will be in a sympathetic direction to the direction of flux developed in one core by the coil but will be opposed to the flux developed in the other core by the coil at the same instant. A bridging piece or magnetic flux conductor connects the cores to complete the circuit for magnetic flux that is developed or generated therein by the magnet. With such an arrangement it will be found that the inductance of the unit will remain constant over a relatively wide range of applied voltages and while ultimately the percentage change in inductance may begin to rise rapidly with higher voltages, it is a much less rapid rise than the situation wherein a coil or coils employing but a single core of equal area or cross-section are used. The inductance of the unit can be made variable or adjustable by moving the magnet toward and away from the cores, and where it is desirable to have the inductance unit in a case that is hermetically sealed or otherwise protected and at the same time to vary the inductance the magnet may be located on the exterior of a non-magnetic hermetically sealed case, and the balance of the unit disposed on the interior thereof. Adjustment of the magnet on the exterior of the case toward and away from the cores on the interior will affect the inductance of the entire device.

With the foregoing and other objects in view, which will be made manifest in the following detailed description and specifically pointed out in the appended claims, reference is had to the accompanying drawings for an illustrative embodiment of the invention, wherein:

Figure 1:
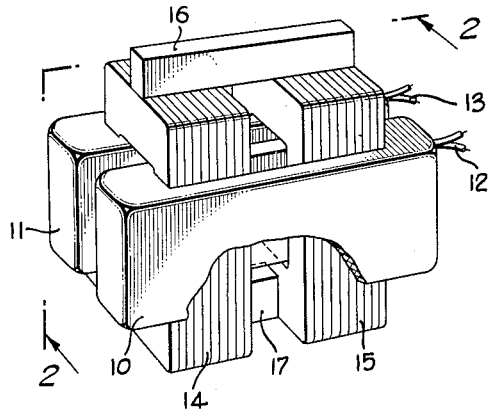
Figure 1 is a perspective view, parts being broken away of the preferred form of inductance device embodying the present invention.
Figure 2:
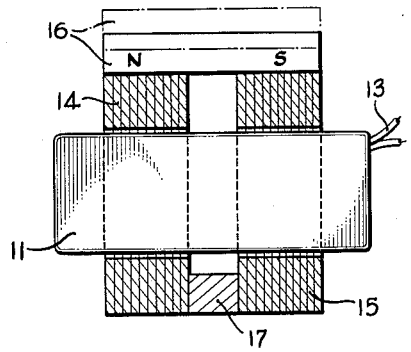
Fig. 2 is a sectional view taken upon the line 2—2 upon Fig. 1.
Figure 5:
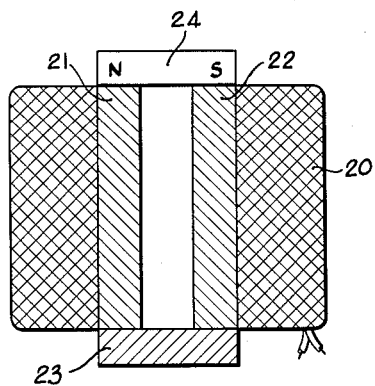
Fig. 5 is a sectional view illustrating a highly simplified alternative form of construction in which the advantages referred to herein may be realized.

Referring to the accompanying drawings wherein similar reference characters designate similar parts throughout, 10 and 11 indicate two coils having leads 12 and 13, respectively, which may be connected either in series or in parallel to an alternating current source used to energize the two coils with alternating current. 14 and 15 indicate two spaced closed cores, portions of which extend through the coil 10 in spaced relation to each other and other portions of which extend through the coil 11 in spaced relation to each other. These cores are illustrated as being formed of laminations but may be formed of any other suitable material which will provide an easy path for magnetic flux. Adjacent the cores 14 and 15 there is a magnet 16 which in the form illustrated in Figs. 1 and 2, is a permanent magnet. This magnet may be regarded as a magnetic flux generator which develops or impresses magnetic flux within the two cores 14 and 15. A bridging member 17 connects the two cores 14 and 15 and serves as a magnetic flux conductor completing the circuit for magnetic flux generated by the magnet 16 and developed or impressed in the cores. It will be appreciated that with this form of construction that the magnetic flux developed by the permanent magnet 16 may pass downwardly through one of the cores, such as the core 14, between the cores through the bridging member 17 which is formed of a material having high permeability, through the other core 15, back to the magnet. The alternating current which is applied to the coils 10 and 11 develops or induces magnetic flux in the cores. At a given instant of time the flux developed in the core 14 by the impressed voltage on the coil will be in sympathy with the flux developed therein by the magnet. At the same instant the flux developed in the core 15 by the coil will be opposed to the flux developed therein by the magnet. While these conditions are being continually reversed for each cycle of impressed voltage, the result is that the inductance of the entire unit will remain substantially constant over a relatively wide range of applied voltages. Thus, as illustrated in Fig. 5 over a range of .02 volt of applied coil voltage to 2 volts, the increase in inductance of the unit is very small. Even where the applied voltage is as high as 20 volts the increase in inducance is less than 15%.

In electric circuits where an inductance coil having the characteristic of maintaining its inductance substantially constant regardless of the applied voltage, the improved construction may be advantageously used.

It is, of course, possible to vary or adjust the inductance of the unit by moving the magnet 16 toward or away from the cores 14 and 15. Consequently, the magnet has been illustrated in Fig. 2 as having been shifted to a spaced position from the cores as is indicated by dotted lines. The particular mechanism or apparatus for adjusting the magnet toward and away from the cores is immaterial insofar as the present invention is concerned and consequently has not been illustrated.

Figure 3:
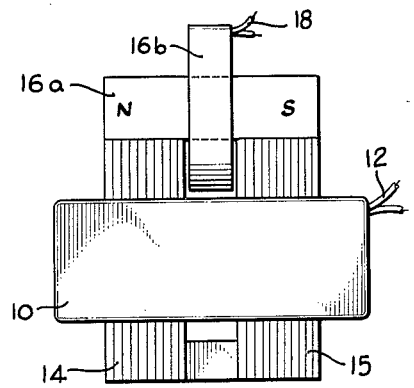
Fig. 3 is a view similar to Fig. 2 but illustrating an alternative form of construction.
Figure 4:
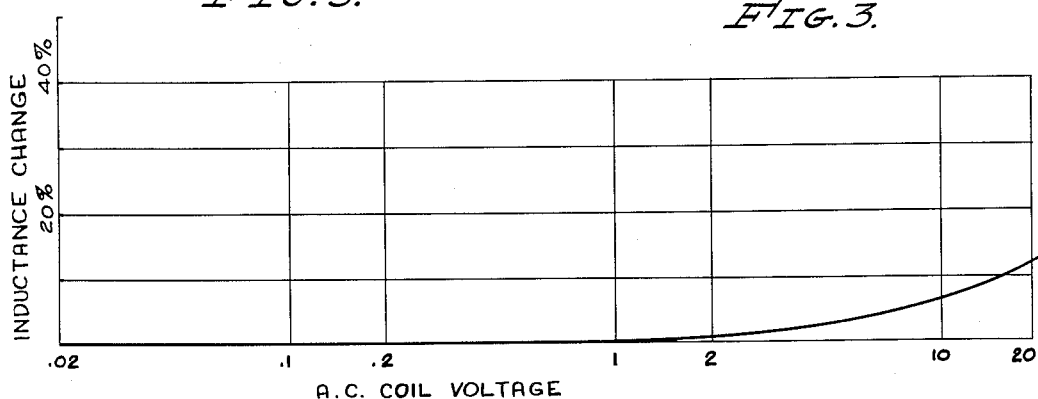
Fig. 4 is a typical graph plotted on semi-logarithmic paper illustrating a typical curve of inductance change per applied coil voltage of a device as depicted in Fig. 1.

In Fig. 3 an alternative form of construction is disclosed wherein in lieu of employing a permanent magnet 16 an electromagnet may be employed indicated at 16a. This magnet may consist of a soft iron core surrounded by a coil 16b that is supplied with direct current through leads 18. This coil may, if necessary, enter between the cores 14 and 15 as illustrated, or if desired, the core 16a may be made U-shaped in form so that only its pole faces are disposed adjacent the cores.

In Fig. 5, a highly simplified form of construction has been illustrated wherein there is a single coil 20 within which there are two cores 21 and 22 disposed in spaced parallel relationship to each other. These cores are connected to each other by a bridging member 23 which has a high permeability for magnetic flux and the opposite ends of the cores have a magnet 24 which may be either a permanent or an electromagnet. This magnet may be adjusted toward and away from the cores to vary the inductance of the unit. In this form of construction the permanent magnet 24 which may be regarded as a magnetic flux generator, induces or imposes magnetic flux in the two cores 21 and 22. The circuit for the flux is completed through the bridging piece 23. At any given instant of time the flux generated in the cores 21 and 22 by the coil 20 will be upwardly. At that instant of time the flux generated in the cores by the magnet may be assumed to be downwardly through the core 21 and upwardly through the core 22. During the other half of the cycle of the alternating current supplied to the coil 20 the direction of flux in the cores 21 and 22 will, of course, be reversed. The flux developed in one core by the coil is sympathetic with the flux developed therein by the magnet 24 and in the other core it is opposed thereto. In this manner, it will be found that regardless of the applied coil voltage within reasonable limits the inductance of the entire unit will remain at a substantially constant value.

From the above-described constructions it will be appreciated that an improved inductance device has been provided wherein the inductance of the unit will not change appreciably over a relatively wide range of applied alternating current voltages. Furthermore, as there are complete circuits provided for paths of magnetic flux there is no flux loss of any appreciable amount and the device may, therefore, be regarded as highly efficient in its operation.

In that form of construction disclosed in Figs. 1 and 5 the variation is accomplished by moving the magnet toward and away from the cores. In that form of construction illustrated in Fig. 3, the electromagnet may be moved toward or away from the cores, or in the alternative, the electromagnet may be permitted to remain stationary and variation accomplished by varying the amount of direct current supplied to its coil. Varying the amount of current supplied to the coil of the electromagnet will increase and decrease the amount of magnetism generated thereby and its effect upon the cores is the same as that which is accomplished by moving a permanent magnet toward and away from the cores. The variation in the amount of direct current supplied to the coil may be accomplished by any suitable resistor.

Various changes may be made in the details of construction without departing from the spirit and scope of the invention as defined by the appended claims.

I claim:

1. An inductance device including in combination, a coil adapted to be electrically energized with alternating current, two spaced closed cores having portions thereof extending through the coil, a magnetic flux conductor connecting the cores, and a unidirectional magnetic flux generator adjacent the cores and bridging the space therebetween to develop or create magnetic flux therein.

2. An inductance device including in combination, a coil adapted to be electrically energized with alternating current, two spaced closed cores having portions thereof extending through the coil, a magnetic flux conductor connecting the cores, and a unidirectional magnetic flux generator adjacent the cores bridging the space therebetween to develop or create magnetic flux therein through a path including the magnetic flux conductor.

3. An inductance device including in combination, a coil adapted to be electrically energized with alternating current, two spaced closed cores having portions thereof extending through the coil, a magnetic flux conductor connecting the cores, and a unidirectional magnetic flux generator adjacent the cores bridging the space therebetween to develop or create magnetic flux therein through a path including the magnetic flux conductor, said magnetic flux generator being adjustable toward and away from the cores.

4. An inductance device comprising two coils adapted to be electrically energized with an alternating current, two parallel spaced closed cores extending through both coils, a flux-conducting bridging piece connecting the cores and a unidirectional flux generating magnet adjacent the cores opposite the bridging piece and bridging the space between the cores.

5. An inductance device comprising two coils adapted to be electrically energized with an alternating current, two parallel spaced closed cores extending through both coils, a flux-conducting bridging piece connecting the cores and a unidirectional flux generating magnet adjacent the cores opposite the bridging piece and bridging the space between the cores, said magnet being adjustable toward and away from the cores.

6. An inductance device comprising two coils adapted to be energized with an alternating electric current, two spaced parallel closed cores extending through both coils, a flux-conducting bridging piece connecting the cores adjacent the centers of one leg of each of the cores, and a unidirectional flux generating magnet adjacent the cores opposite the bridging piece and bridging the space between the cores.

7. An inductance device including in combination, a coil adapted to be electrically energized, two spaced parallel cores within the coil, a flux-conducting bridging piece connecting the cores adjacent one end thereof, and a unidirectional flux generating magnet adjacent the cores adjacent the other ends thereof and bridging the space therebetween.

8. An inductance device comprising two coils adapted to be electrically energized with an alternating current, two spaced cores extending through both coils, a flux-conducting bridging piece connecting the cores and an electromagnet adjacent the cores bridging the space therebetween having a coil adapted to be supplied with variable direct current.

9. An inductance device comprising a coil adapted to be energized with alternating voltage, two spaced cores extending through the coil, a conductor for magnetic flux connecting the cores in a direction transverse to the paths of magnetic flux through the cores, and means for impressing unidirectional magnetic flux on the cores to pass at least partially through one core, through the conductor, and at least partially through the other core.

10. An inductance device comprising two spaced cores, a coil encircling portions of both of said cores, a unidirectional magnetic flux generator bridging the space between the cores, and a magnetic flux conductor also bridging the space between the cores remote from the magnetic flux generator.

11. An inductance device comprising two spaced cores, a coil encircling portions of both of said cores, a unidirectional magnetic flux generator bridging the space between the cores, and a magnetic flux conductor also bridging the space between the cores on the opposite side of the coil from the magnetic flux generator.

References Cited in the file of this patent

UNITED STATES PATENTS

| | | |
|---|---|---|
| 1,788,152 | Dowling | Jan. 6, 1931 |
| 1,896,510 | Given | Feb. 7, 1933 |
| 2,127,237 | Sola | Aug. 16, 1938 |
| 2,228,731 | Pugh | Jan. 14, 1941 |
| 2,503,155 | Harvey | Apr. 4, 1950 |